(No Model.)
J. MARIS.
HUB BAND.
No. 522,225. Patented July 3, 1894.
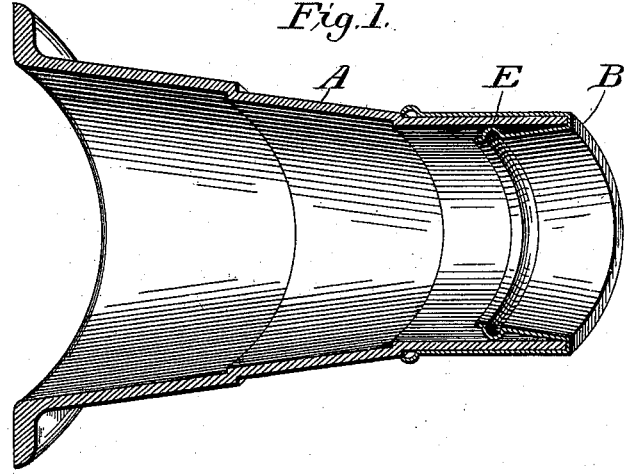
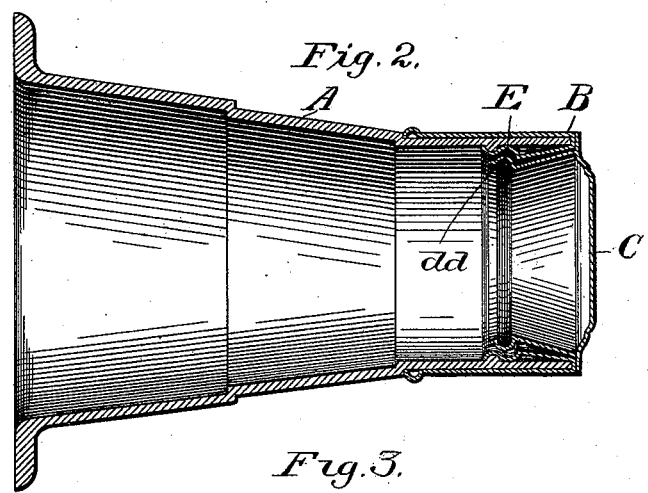
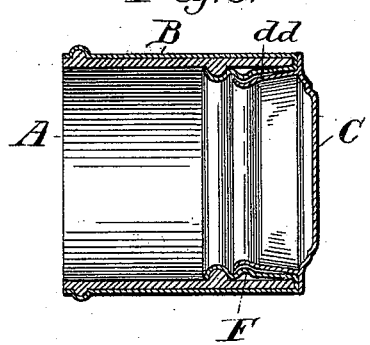
Witnesses
Inventor:
Jared Maris
By James N. Ramsey
His Attorney

UNITED STATES PATENT OFFICE.

JARED MARIS, OF CINCINNATI, OHIO.

HUB-BAND.

SPECIFICATION forming part of Letters Patent No. 522,225, dated July 3, 1894.

Application filed May 24, 1893. Serial No. 475,386. (No model.)

*To all whom it may concern:*

Be it known that I, JARED MARIS, a citizen of the United States, residing in the city of Cincinnati, county of Hamilton, and State of Ohio, have invented certain new and useful Improvements in Covers and Linings for the Ends of Hub-Bands; and I do hereby declare the following to be a full, clear, and exact description of the invention, such as will enable others skilled in the art to which it appertains to make and use the same.

My invention relates to an improvement in ornamental covers and linings for point bands for vehicle hubs which are spun or drawn from sheet metal and may be securely affixed to the point-band or an extension of the hub-band which forms a part of the same and also provides a secure fastening for dust and mud caps made with springs or dogs such as are shown in the accompanying drawings.

With this object in view the invention consists in certain novel features of construction of parts and combinations and arrangements of the same, as hereinafter set forth and pointed out in the claims.

In the accompanying drawings: Figure 1 represents in longitudinal section a shell in common use for carriage hubs having the point band cast with it as an extension also showing my improved cover and lining in place. Fig. 2 represents the same as Fig. 1 as to the shell band with cover and lining except that the band shows a bead or flange in common use over which one form of my improved lining is spun; and also shows a section of dust and mud cap in position. Fig. 3 is a section of an ordinary point band for hubs showing another form of my invention in which a bead is used instead of a circumferential groove and the groove made in the springs of the dust caps reversing the order but accomplishing the same purpose as to holding the dust caps.

To more particularly describe my invention as shown by the drawings, the groove is marked in Figs. 1 and 2 with E. F represents the bead as shown in Fig. 3. A represents the bands and B the linings in each of the figures and C the dust caps. *d d* are the springs in dust caps that catch into the groove or over the bead in the lining as shown at E and F.

The object of my invention is primarily to provide such a recess as will form an abutment to hold dust and mud caps in place on the hub, and will insure against rattling or coming off; and also to provide a holding abutment forward of the flange used in shell, Fig. 2 which is located so near the end of the wood hub that there is not room for clutches on the dust caps to catch. Secondarily my object is to increase the strength and bearing power of the lining, so as to cause greater friction both on the outside and inside of the band in order to hold the cover and lining on by friction without other appliances or tools than those necessary to drive them on. These desirable objects I attain by the groove and bead as shown in drawings and hereinafter claimed.

I am aware that linings and covers are made for point bands that form an abutment for locking springs of dust and mud caps over the end of the lining which prohibits the dust cap from losing in most cases but does not, as experience has shown in use, prohibit it from rattling because it is not practicable in ordinary manufacturing methods to get (or to keep when in use) exactly corresponding length of spring and lining from end of band to offset in lining and flange of cap to the offset in spring; and any change in spring by wear or set from compression that lengthens it causes the cap to strike the end of the band or lining and rattle. My invention cures this by making an abutment to prohibit the dust cap from coming out and also another to keep it from going in and the grooves being of uniform depth the cap is held at this point in place independently of the end bearing of cap flange against band and all inequalities in length appear between cap flange and end of band which is readily covered by shape of flange.

I hereby disclaim all covers and linings that have not a circumferential groove or do not contain a continuous circumferential bead in the lining inside the band, or double abutment to keep the springs or dogs from going in or out.

What I claim, and desire to secure by Letters Patent, is—

1. The combination of a point band for vehicle hubs and a sheet metal cover and lining when the lining contains an internal circumferential groove, substantially as described and for the purposes set forth.

2. The combination of a point band for vehicle hubs of a sheet metal cover and lining when the lining contains an internal circumferential groove and is spun over an internal flange in the band, substantially as described.

3. The combination of a point band for vehicle hubs of a cover and lining of a dust and mud cap when the lining contains an internal circumferential groove into which the springs of the dust and mud cap expand to lock it in place, substantially as and for the purposes set forth.

4. The combination of a point band for vehicle hubs of a sheet metal cover and lining of an internal bead of a dust and mud cap when the springs contain a groove adapted to fit over the bead, substantially as and for the purposes set forth.

5. The combination of a point band for vehicle hubs of a sheet metal cover and lining of a dust and mud cap when the lining is provided with a groove or bead which supplies a bearing for both sides of the bead or groove in the springs for locking the dust and mud cap in place, substantially as described.

JARED MARIS.

Witnesses:
JAMES N. RAMSEY,
BENJAMIN BLOCH.